United States Patent
Kobayashi

(10) Patent No.: US 6,494,523 B2
(45) Date of Patent: Dec. 17, 2002

(54) HARNESS-WIRING SYSTEM FOR A SLIDING DOOR OF VEHICLES

(75) Inventor: Yoshinao Kobayashi, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/733,914

(22) Filed: Dec. 12, 2000

(65) Prior Publication Data

US 2001/0004022 A1 Jun. 21, 2001

(30) Foreign Application Priority Data

Dec. 14, 1999 (JP) .......................................... 11-354959

(51) Int. Cl.$^7$ ................................................. B60J 5/06
(52) U.S. Cl. .................... 296/155; 174/113 R; 361/826
(58) Field of Search ........................ 296/155; 174/72 A, 174/68.3, 69, 117 M, 113 R, 110 R, 124 R, 110 PA, 110 SR; 49/26, 27, 28; 361/826

(56) References Cited

U.S. PATENT DOCUMENTS

| | | | | |
|---|---|---|---|---|
| 2,759,990 | A | * 8/1956 | Bean | 174/69 |
| 3,126,442 | A | * 3/1964 | Roberts | 174/69 |
| 3,364,305 | A | * 1/1968 | Hanlon et al. | 40/124.09 |
| 5,877,936 | A | * 3/1999 | Nishitani et al. | 174/69 |
| 6,036,259 | A | * 3/2000 | Hertel et al. | 174/117 F |
| 6,161,894 | A | * 12/2000 | Chapman | 296/155 |
| 6,176,715 | B1 | * 1/2001 | Buescher | 439/162 |
| 6,284,974 | B1 | * 9/2001 | Albert et al. | 174/68.3 |
| 6,290,283 | B1 | * 9/2001 | Fukumoto et al. | 296/155 |
| 6,333,461 | B1 | * 12/2001 | Marcou et al. | 174/68.3 |

FOREIGN PATENT DOCUMENTS

| | | | |
|---|---|---|---|
| JP | 10-936 | | 1/1998 |
| JP | 2001-151042 | * | 6/2001 |

OTHER PUBLICATIONS

An English Language abstract of JP 10–936.

* cited by examiner

Primary Examiner—D. Glenn Dayoan
Assistant Examiner—Jason Morrow
(74) Attorney, Agent, or Firm—Greenblum & Bernstein, P.L.C.

(57) ABSTRACT

A harness-wiring system is provided that includes a wire harness extending from the body of an automobile to a sliding door thereof. The sliding door include a harness housing with a guiding slot. A portion of electrical cables forming the wire harness is passed through a net-like sheath knitted from resin threads, and this portion is folded into the harness housing, so as to form a U-shaped configuration in the harness housing. The system includes a first clamping device having a mount. This first clamping device fixes the net-like sheath onto the electrical cables, while fixing itself to the harness housing. The system further includes a second clamping device having a guide. The second clamping device fixes the net-like sheath onto the electrical cables, while fitting the guide with the guiding slot. The construction of the wire harness connection between the car body and the sliding door is thus simplified.

21 Claims, 9 Drawing Sheets

FIG.1 A
PRIOR ART
FIG.1 B
PRIOR ART
FIG.1 C
PRIOR ART
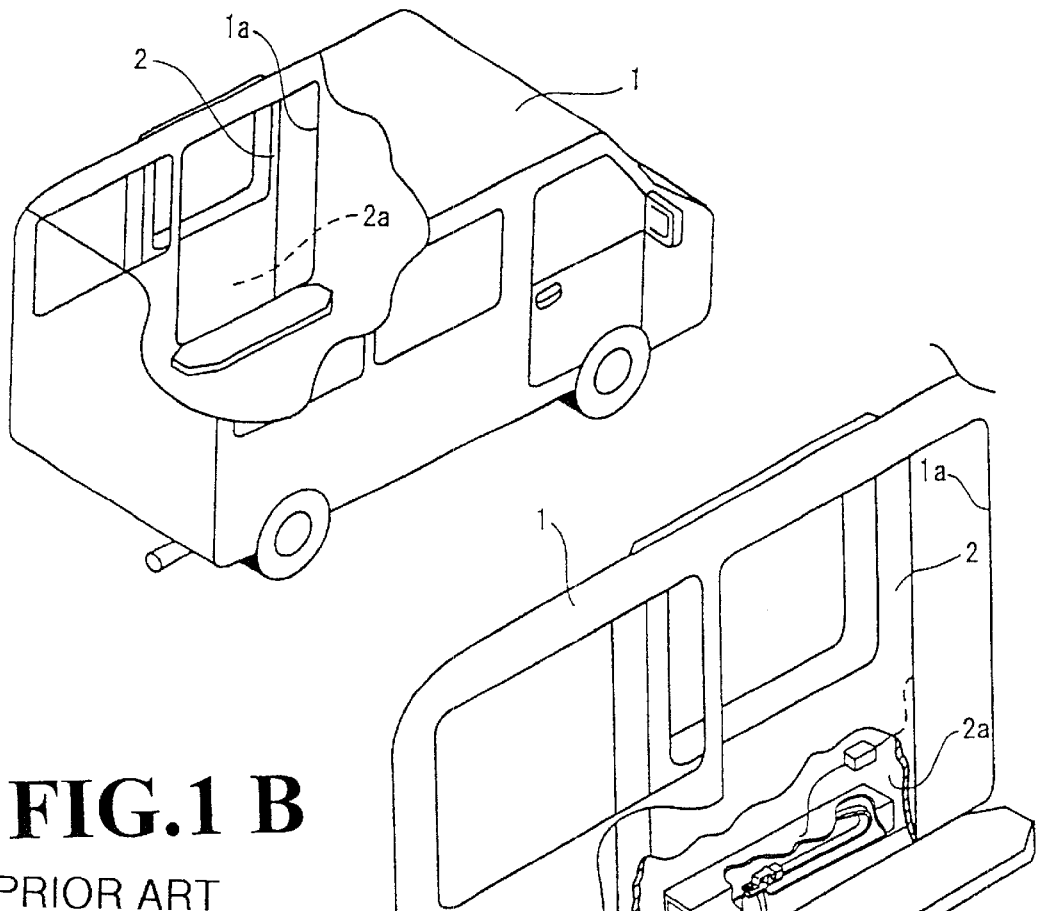
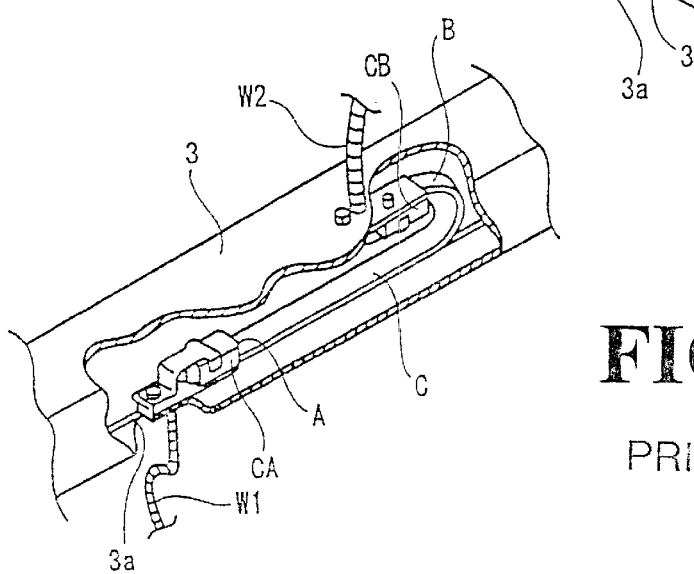

HARNESS-WIRING SYSTEM FOR A SLIDING DOOR OF VEHICLES

BACKGROUND OF THE INVENTION

1. Field of the Invention

The present invention generally pertains to a wiring system for a wire harness, with applications for electrically connecting electrical devices depending from a sliding door of a vehicle to the main body portion. Such a sliding door is commonly found in some types of road vehicles, e.g. automobiles.

2. Description of Background Information

A sliding door system is frequently adopted in a single-volume (or "monospace") car, RV car (recreational vehicle), or van. The door slides freely in front-to-rear and rear-to-front directions (along the vehicle's length direction). Such a sliding door is usually equipped with various electrical devices such as touch sensors for preventing door-pinching, loudspeaker systems for an audio system, and the like. In order to supply power to these electrical devices, a wire harness is extensively wired from the body of a vehicle into its sliding door, and is then taken inside the sliding door in an appropriate manner.

FIGS. 1A, 1B and 1C show a commonly adopted wiring system for a vehicle sliding door wire harness. The sliding door 2 moves forward and backward along the vehicle's length. A door is opened (giving access to a door opening 1a) or closed, in accordance with its sliding displacement. The inside lower end 2a of the sliding door 2 is provided with a box-like harness housing 3 including a guiding channel 3a. Alternatively, the harness housing 3 may be installed in the vehicle's body 1, depending on the type of a vehicle.

The wire harness is led from inside the vehicle's body 1 through to inside the sliding door 2. For this purpose, a first group of electrical cables W1 is wired from the body 1 to the sliding door 2. The former is then fitted with an end portion A of a flat harness C. The flat harness C is folded over itself in the harness housing 3 to form a U-shaped loop portion, so as to provide sufficient spare length therein. Another end portion B of the flat harness C is connected to a second group of electrical cables W2, which is wired into and inside the sliding door 2. The first group of electrical cables W1 and the flat harness C are connected through a first harness connector CA, while the second group of electrical cables W2 and the flat harness C are connected through a second harness connector CB. The first harness connector CA carries a sliding device which engages with the guiding channel 3a of the harness housing 3 in a freely slidable way. The second harness connector CB is fixed to the harness housing 3.

FIG. 2A shows the condition of the above wiring system harness when the sliding door 2 is closed. The first group of electrical cables W1, wired between the body part 1 and the sliding door 2, is positioned at the rear side of the sliding door 2, while the second harness connector CB, contained in the sliding door 2, is placed in the front side relative to the first harness connector CA. The flat harness C is then maintained in a U-shaped looped configuration. FIG. 2B shows a condition when the sliding door 2 is opened. In this case, as the sliding door 2 is being opened, the harness housing 3 moves rearward relative to the first harness connector CA connected to the body part 1. In the harness housing 3, the first harness connector CA is placed forward, relative to the second harness connector CB. In this manner, the flat harness C changes its shape in the harness housing 3 with the opening and closing movements of the sliding door 2.

In a known wire harness system applied to a vehicle sliding door, a flat harness is folded and provided with a looped extra-length portion, so that the latter can follow the opening and closing movements of the sliding door. However, problems arise because there is little space available between the top and bottom faces of the sliding door. The flat harness must therefore have a very high bending capacity. It must also have a high wear resistance, because the opening and closing of the sliding door has a rubbing action. For these reasons, a so-called "flat cable" is used in place of the flat harness. FIGS. 3A and 3B shows another arrangement for a flat cable C', which may be adopted as a function of the type of vehicle. In this case, the flat cable C' folded in a U-shape loop portion is turned sideways, and the ex portion is extended or folded as the door 2' opens or closes. A harness housing 3' may have an open base, depending on the housing used.

However, when a flat harness or a flat cable is used for a folded extra portion, end portions of the flat harness or flat cable must be connected through first and second harness connectors respectively to a first group of electrical cables at the side of the vehicle's body part and to a second group of electrical cables at the side of the sliding door. Such a construction requires a number of component parts, and results in troublesome mounting operations. Moreover, the connector-fitting portions must often be reinforced by molding, in order to ensure reliable connections and secure a waterproof quality. This molding step increases operational steps and incurs higher costs.

SUMMARY OF THE INVENTION

The present invention was contemplated to solve such problems, and provides an integrated wire harness system ranging from the vehicle's body to inside the sliding door, in which system the folded portion can be folded flexibly and possesses a high wear resistant property.

To this end, there is provided a harness-wiring system, in which a wire harness, including electrical cables, electrically connects a body of a vehicle to a sliding door thereof, one of the body and the sliding door including an enclosure, the wire harness including a lengthwise portion stored in the enclosure such as to form a folded portion having first and second enclosed end portions, so that the wire harness can follow opening and closing movements of the sliding door by changing the shape of the folded portion.

The above wire harness extends, as a joint-less continuous unit, from the body to the sliding door via the folded portion, and has first and second cable ends. The first cable end is adapted to fit with a body-side connector, while the second cable end is adapted to fit with a door-side connector. The wire harness is then placed inside a net-like sheath (net tube) for at least that part of folded portion. Such a net-like sheath is formed by knitting resin threads.

Alternatively, the wire harness may be placed inside the net-like sheath extending substantially from the body-side connector to the door-side connector.

Suitably, the folded portion further includes an elastic band, laid along the electrical cables at least at one locus of inside the net-like sheath and outside the net-like sheath.

Preferably, the system further includes a first clamping device including a pair of fixing pieces respectively including a semicircular recess, so that, when the fixing pieces are connected, both of the semicircular recesses form a holder. A hinge portion that pivotally connects the pair of fixing pieces is provided at one end of the pair of fixing pieces, and locking mechanism is located at the other end of the pair of fixing pieces, distal to the hinge portion, so that the first clamping device holds the first enclosed end portion of the wire harness by the pair of fixing pieces, and is locked by the locking mechanism.

Typically, the enclosure includes a first fitting device and the first clamping device includes a second fitting device, so that the first clamping device is fixed to the enclosure by fitting the first fitting device to the second fitting device.

Preferably yet, the system further includes a second clamping device including a pair of fixing pieces respectively including a semicircular recess, so that, when the fixing pieces are connected, both of the semicircular recesses form a holder. A hinge portion that pivotally connects the pair of fixing pieces is provided at one end of the pair of fixing pieces, and locking mechanism is located at the other end of the pair of fixing pieces, distal to the hinge portion, so that the second clamping device holds the second enclosed end portion of the wire harness by the pair of fixing pieces, and is locked by the locking mechanism.

Typically, the enclosure includes a first guide, and the second clamping device includes a second guide, so that the second clamping device is fitted to the enclosure by fixing the second guide to the first guide in a freely movable manner.

Preferably, the net-like sheath includes knitted resin threads.

The enclosure having the first guide may be a case or box including a slot which serves as a guide rail or channel. The case may be fixed to a sliding door or to a part of the vehicle body. Conversely, the enclosure may be prepared by transforming a panel, incorporating the panel into a part of the body or sliding door, and then forming a guide in the enclosure.

The wire harness according to the invention may be formed of electrical cables, continuously wired from the body of a vehicle to a sliding door. The same electrical cables form an extra-length portion folded in U-shape. This folded portion must satisfy a flexibility or foldability requirements. These requirements can be satisfied by providing the electrical cables, and wrapping them with a flexible and stretchable cylindrical net-like sheath. Moreover, this net-like sheath is resistant to wear, so that the electrical cables included therein do not suffer from wearing actions and ensuing damage.

The net-like sheath may be formed by knitting resin threads, e.g., nylon or PET, into a cylindrically shaped net structure. However, it can also be formed by making openings in a resin tube. The net-like sheath thus produced is stretchable. The sheath expands diametrically when pressed in a longitudinal direction, thereby facilitating the insertion of the electrical cables. The net-like sheath has sufficient flexibility to be flexed into a tight curve. Moreover, the resin threads and the portion covered therewith have a high level of hardness and anti-wear property, so that rubbing in the harness case does not create problems.

As the electrical cables are passed through the net-like sheath, the former is bundled and contained in the harness case while maintaining its foldability. The net-like sheath folded in a U-shape can change its shape smoothly, following the opening and closing movements of the sliding door. The inventive structure thus confers to the wire harness a flexibility and wear resistance at least equivalent to that obtained for known flat harnesses or flat cables. As a result, a wire harness, extending from the body to the sliding door, can be constituted only by continuously extending electrical cables. This can thus obviate the need for connectors hitherto used for connecting the flat harness and the electrical cables. Consequently, assembly steps and the number of component parts can be greatly reduced, and production costs are lowered.

Preferably, the electrical cables are placed inside the net-like sheath, continuously from the body-side connector to the door-side connector.

In such a construction, not only the folded portion, but the entire length of the electrical cables is covered with the net-like sheath. Thus, there is no need to use another protecting means e.g. a corrugated tube or a vinyl chloride tube. Assembling operations are thus simplified and can be effected efficiently.

Preferably, the folded portion includes an elastic band, e.g. a spring or resilient metal band, laid therealong, at least at one locus of the inside and the outside of the net-like sheath. When the resilient metal band is installed outside the net-like sheath, the metal band is preferably fixed to the net-like sheath by taping.

A droop tends to occur at the curved edge of the U-shaped folded portion. When the elastic metal band is extended along the electrical cables, this droop can be avoided. Nonetheless, the electrical cables and elastic metal band, passed through the net-like sheath, can still change their shape in conjunction with sliding door's movements. Particularly, when the U-shaped folded portion is placed horizontally, instead of vertically, the curved edge of the folded portion tends to droop or hang down more easily. This droop creates friction with the harness case. If the bottom of the harness case is open, the droop will extend beyond the bottom of the sliding door. In such cases, the elastic metal band, aligned with the electrical cables, tends to reinforce the rigidity of the latter, and prevent such droop very efficiently.

Preferably, the system includes a first clamping device including a pair of fixing pieces which form a through hole when superposed, a hinge that pivotally connects the pair of pieces being located at one end of the pair of pieces, and locking mechanism located at the other end thereof, distal to the hinge. The first clamping device holds either the net-like sheath and the electrical cables together, or the cylindrical tube, the resilient band and the electrical cables together, by the pair of fixing pieces, and is locked by the locking mechanism.

In such construction, the net-like sheath is installed easily and securely. Alternatively, the net-like sheath can be fixed onto the electrical cables by taping.

The first clamping device used for fixing the net-like sheath onto the electrical cables may include a mount and a guide. This construction avoids having to prepare an extra clamp with a mount to be hooked with the harness housing, or another clamp with a guide to be applied to the electrical cables. The number of component parts is thus reduced, and mounting operations of the sliding door are simplified.

Furthermore, the system may include a second clamping mechanism having a second guide, the folded portion of the electrical cables having first and second ends. The first clamping device then clamps the first end of the folded portion from above the net-like sheath, and the second clamping device clamps the second end of the folded portion from above the net-like sheath, so that the second guide fits with the first guide in a freely movable manner.

Further yet, the system includes a first clamping device with a fitting mount, and the enclosure is fixed to the sliding door. The electrical cables, which are contained in the net-like sheath having first and second ends, are stored inside the enclosure in a U-shaped configuration. The first clamping device then clamps the electrical cables from above the first end of the net-like sheath, while the fitting mount is fitted with the enclosure may further include a second clamping device having a second guide, and the second clamping device clamps the electrical cables from above the second end of net-like sheath, so that the second guide is fitted with the first guide in a freely movable manner.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which:

FIGS. 1A, 1B and 1C are partly exploded perspective views of a known wire harness system, in which a vehicle body is electrically linked to a sliding door;

DETAILED DESCRIPTION OF THE PREFERRED EMBODIMENTS

The present invention relates to a wire harness wired from a vehicle's body 1 to a sliding door 2, as shown in FIGS. 1A, 1B and 1C. As mentioned for the prior art, the sliding door 2 contains a harness housing 3 in its bottom portion 2a, and the harness housing 3 contains an extra-length cable stored in a U-shaped configuration. The extra-length cables change their configuration in conjunction with the opening and closing movements of the sliding door 2.

Figure 4:
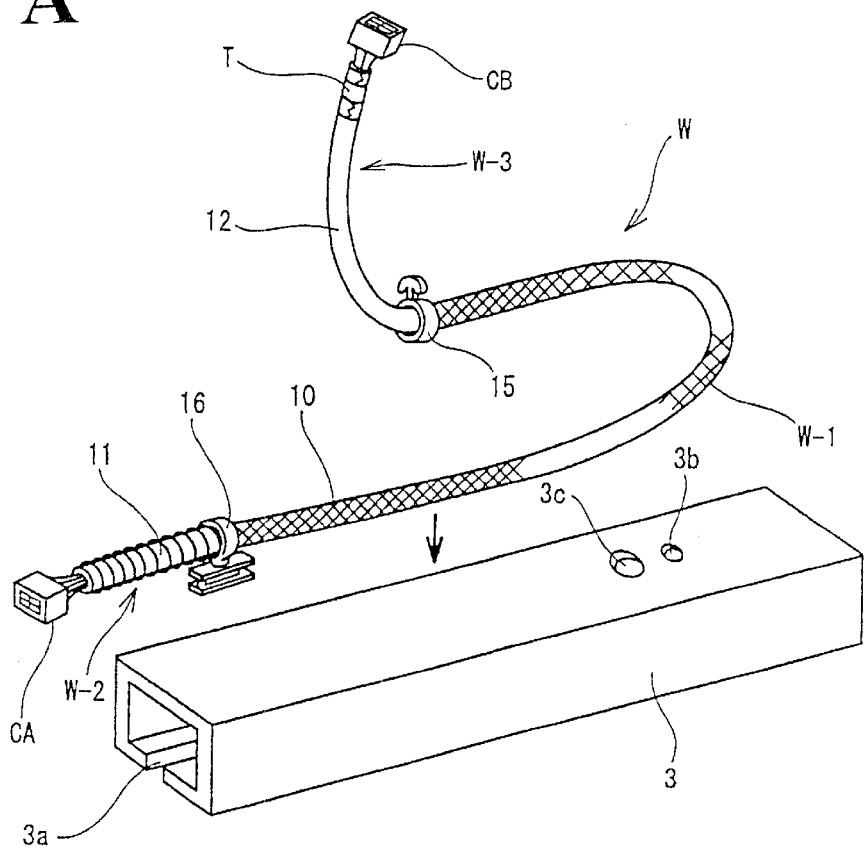
FIGS. 4A and 4B show the wire harness system according to a first embodiment of the invention, respectively by a perspective view before a wire harness is mounted into a harness case, and by a partly exploded perspective view when the wire harness is mounted into the harness case.
Figure 4:
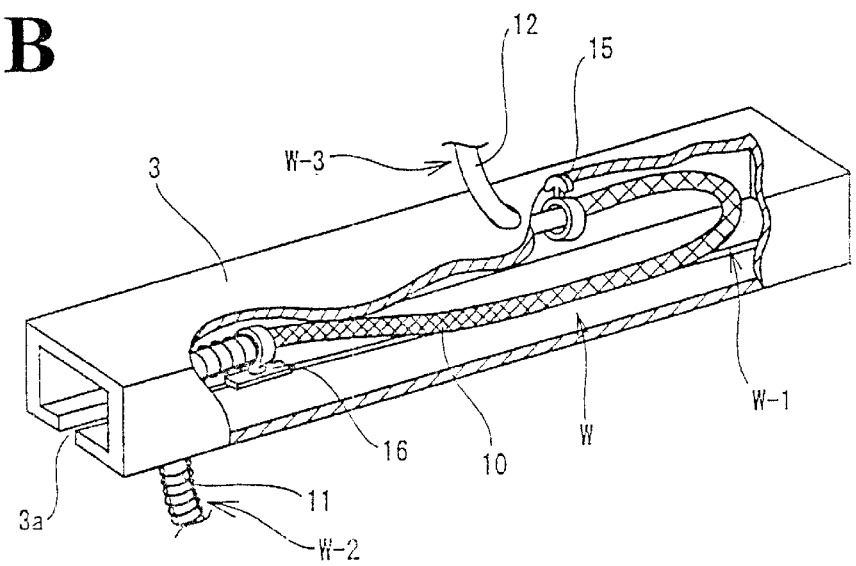
Figure 5:
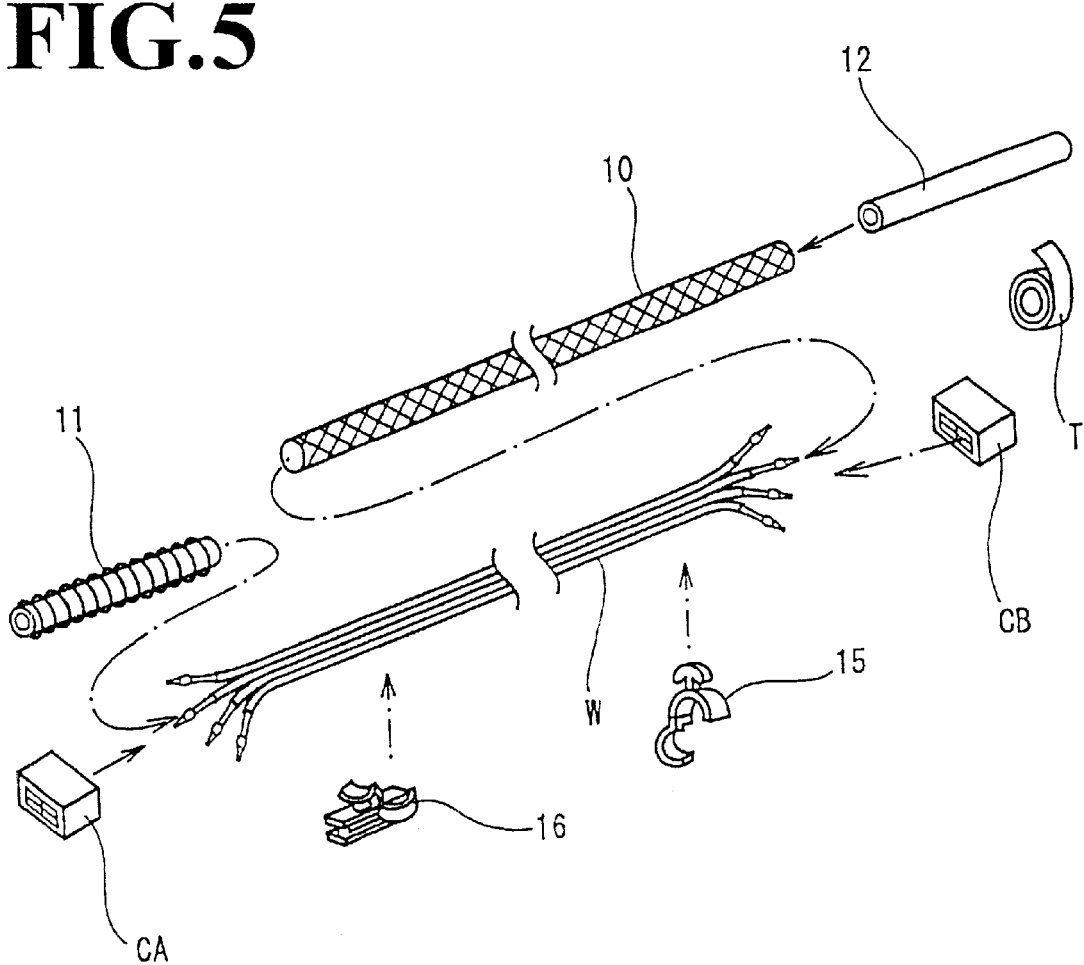
FIG. 5 is a perspective view of disassembled constituent parts of the wire harness system of FIG. 4.

FIGS. 4A and 4B and FIG. 5 show a first embodiment of the invention, according to which the wire harness wired from the vehicle's body 1 to the sliding door 2 is constituted by a group of continuous electrical cables W, e.g. a group of four electrical cables as shown in FIG. 5. The extra length of the harness portion contained in the harness housing 3 is indicated as a folded or folded portion W-1, which is passed through a net-like sheath 10 of, for example, cylindrically knitted or braided resin threads. The resin threads are made of, e.g., nylon or poly (ethylene terephthalate) (PET). The net-like sheath 10 is stretchable, and diametrically expands when longitudinally pressed, in the manner of a Chinese finger puzzle. The sheath 10 has flexibility, so that it can be folded easily, with a small radius of curvature.

A first end portion W-2 of the electrical cables W extends from one end of the net-like sheath 10 toward the body part 1, and is fitted with a first harness connector CA (body-side connector). The first end portion W-2 is substantially protected by a corrugated tube 11. A second end portion W-3 of the electrical cables W extends from the other end of the net-like sheath 10 towards the sliding door 2, and is fitted with a second harness connector CB (door-side connector). The second end portion W-3 is substantially wrapped, for example, with a vinyl chloride tube 12. Further, the end of the second end portion W-3 is folded with a tape T.

Figure 6:
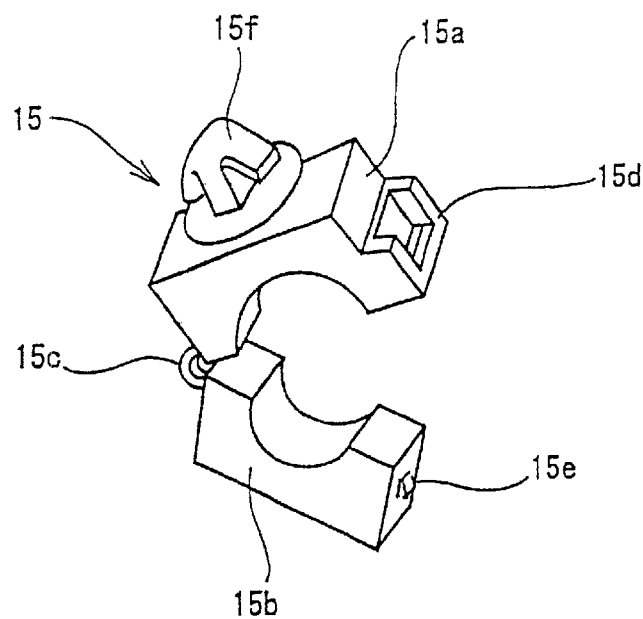
FIGS. 6A and 6B are perspective views, respectively, of a door-side clamp and of a body-side clamp.
Figure 6:
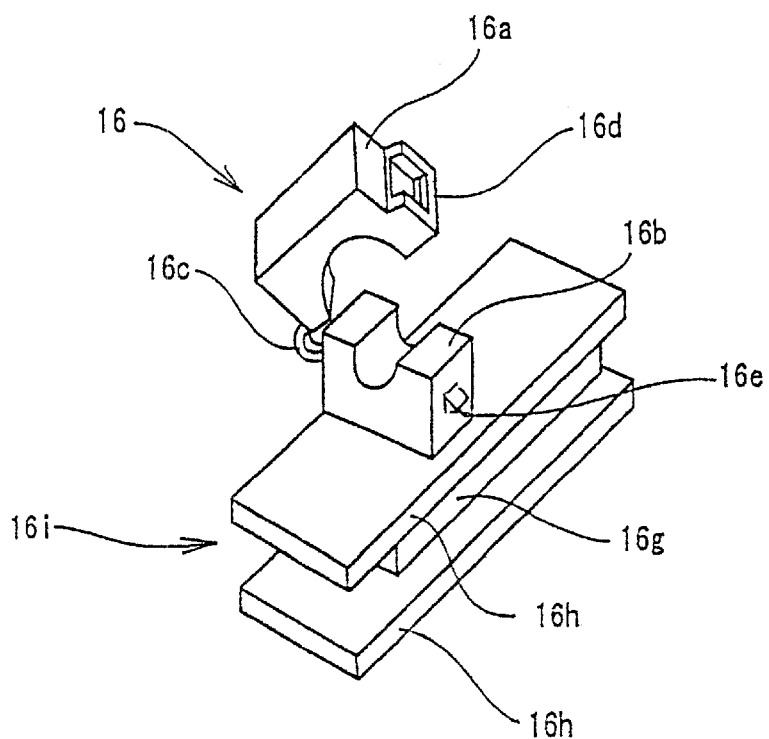

The two ends of the net-like sheath 10, which define the folded portion W-1 of the electrical cables W, are provided with a first clamp 15 (door-side clamp) and a second clamp 16 (body-side clamp). As shown in FIG. 6A, the first clamp 15 is formed from a pair of component pieces 15a and 15b, respectively including a semicircular recess, so that, combined, two semicircular recesses form a holding aperture for the net-like sheath. The two pieces also include a thin hinge portion 15c at one end portion, so that they are linked and can be pivoted for opening or closing. The other end portion, distal to the hinge portion 15c, includes a protruding locking hook 15d and locking detent 15e. Further, the outer face of one of the pieces 15a is provided with an arrow-shaped fixing mount 15f. Alternatively, the hinge portion 15c may be replaced by an additional interfitting locking hook 15d and locking detent 15e so that the component pieces 15a and 15b are detachably connected.

The net-like sheath 10 is clamped by the pair of pieces 15a and 15b of the first clamp 15, and locked with the locking hook 15d and the locking detent 15e. In this manner, the net-like sheath 10 is firmly clamped onto the electrical cables W which pass inside it. Thereafter, the arrow-shaped fixing mount 15f of the clamp 15 is fitted into a mount hole 3b provided in the harness housing 3. The electrical cables W are drawn out from the net-like sheath 10 through a cable hole 3c, also provided in the harness housing 3 (see FIG. 4A). As mentioned above, the portion of electrical cables W drawn out from the harness housing 3 towards the sliding door 2 is covered with a vinyl chloride tube 12, and the tip of this portion is fixed to a connector, which is then fitted with a door-side connector CB'.

The other end of the net-like sheath 10 is fitted with a second clamp 16. FIG. 6B shows the second clamp 16, which includes, as does the first clamp 15, a pair of component pieces 16a and 16b, respectively including a semicircular recess, and a hinge portion 16c linking component pieces. The end portion of second clamp 16, distal to the hinge portion 16c, is provided with a protruding second locking hook 16d and second locking detent 16e. Of course, the hinge portion 16c can also be replaced by an additional locking hook 16d and locking detent 16e in the same manner as noted above for the first claim 15. One of the component pieces 16b is provided a guide 16i. The guide 16i includes two wing portions 16h adapted for rubbing movements, and a sliding recess 16g interposed therebetween.

The net-like sheath 10 is fitted into the pair of component pieces 16a and 16b, and is clamped by the second locking hook 16d and the second locking detent 16e of the second clamp 16, whereby the electrical cables W inside the net-like sheath 10 are firmly fixed. In this condition, the sliding recess 16g of the guide 16i in the second clamp 16 is fitted with the two side edges of the guiding channel 3a in a freely movable way. The guiding channel 3a is therefore formed beforehand in the base plane of the harness housing 3, by a continuous open slot or slit in the base plane in a longitudinal direction thereof In this manner, the sliding recess 16g thus slides forth or back in the harness housing 3 in a freely movable manner.

As shown in FIGS. 4A and 4B, the electrical cables W extending from the locus where the second clamp 16 is fixed is pulled out of the harness housing 3. This pulled-out portion is then wrapped into a corrugated tube 11, and the cable ends are fitted with terminals, which is in turn are fitted with a body-side connector CA located at the side of the car body. Accordingly, in the harness housing 3, the folded portion W-1, protected by the net-like sheath 10, has one end oriented upwardly and the other end oriented downwardly, respectively, and is returned in a U-shape in the rear side (relative to the car's length direction) of the harness housing 3.

Figure 7:
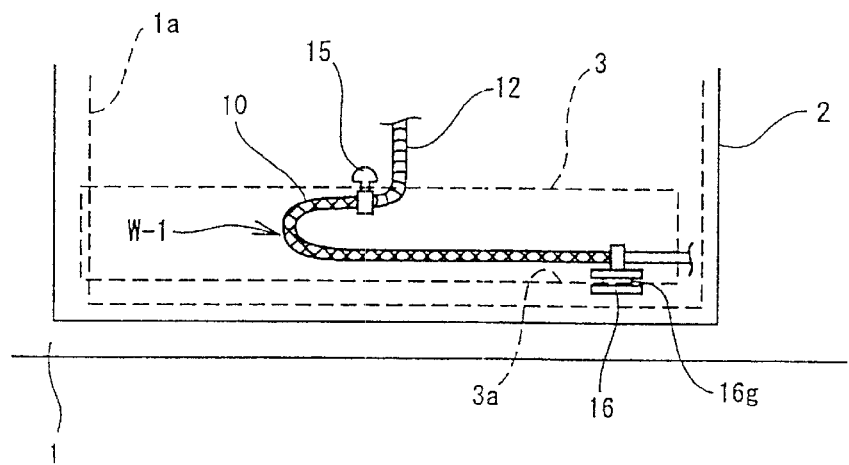
FIGS. 7A and 7B illustrate the wire harness system of the first embodiment of the invention, respectively, when the sliding door is closed, and when it is open.
Figure 7:
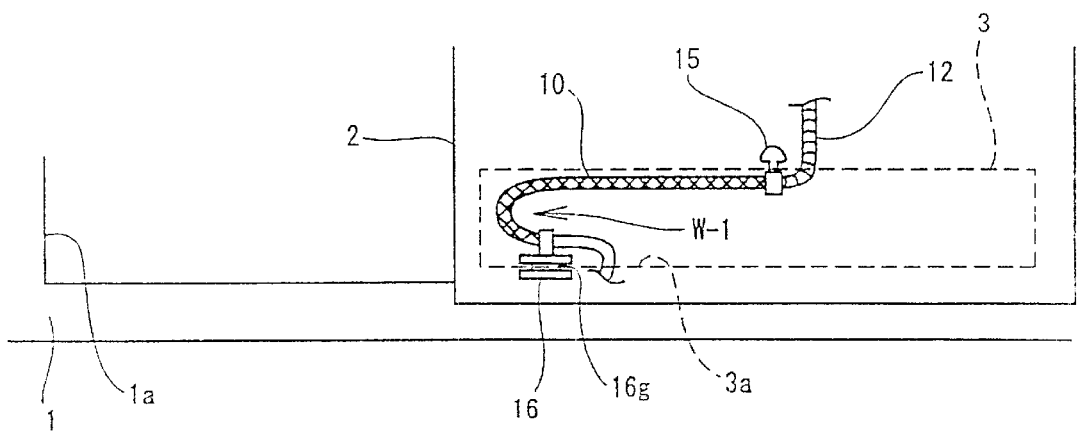

In the electrical cables W for such a wire harness, the U-shaped folded portion W-1 is passed through a flexible net-like sheath 10, so that the cables W are bundled and easily bendable (FIG. 4B). As shown in FIGS. 7A and 7B, the folded portion W-1 changes its shape in conjunction with the opening or closing movements of the sliding door 2.

FIG. 7A shows when the sliding door 2 is closed, in which case the first clamp 15 is positioned at the forward side (in the length direction of the car) with respect to the second clamp 16. When the sliding door 2 is opened as shown in FIG. 7B, the harness housing 3 moves rearwardly, while the second clamp 16 stays in the same position. During this rearward movement, the guiding channel 3a of the harness housing 3 slides against the sliding recess 16g of the second clamp 16, until the relative position of the second clamp 16 is formed with respect to the first clamp 15. Accordingly, the folded portion W-1, protected by the net-like sheath 10, moves along the inner surface of the harness housing 3, in conjunction with the sliding door's movement. Nevertheless, because the net-like sheath 10 is wear-resistant, the electrical cables contained therein are not susceptible to damage due to wear.

Figure 8:
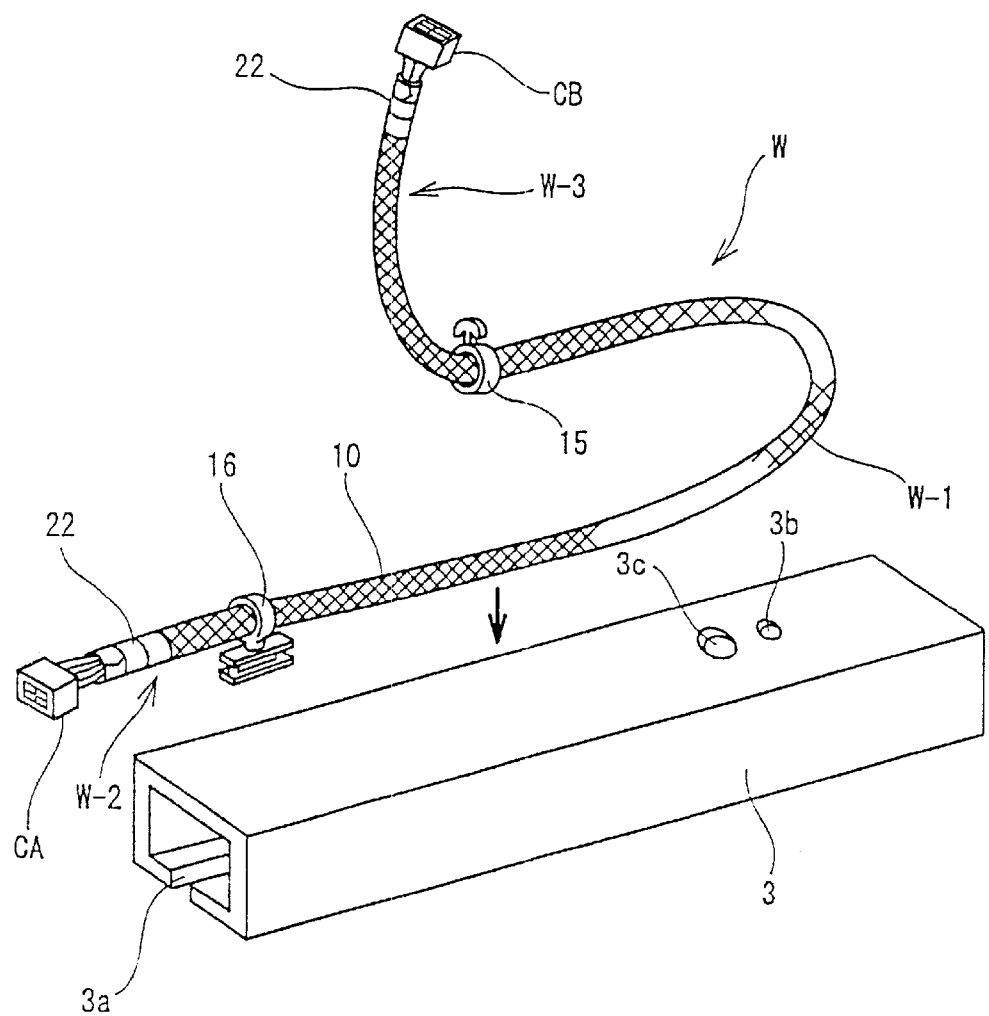
FIG. 8 is a perspective view of the wire harness system according to a second embodiment of the invention, before the wire harness is mounted into the harness housing.

FIG. 8 shows a second embodiment of the invention, in which the electrical cables W are protected entirely over their length, from its one end portion fitted with the body-side connector CA to its other end portion fitted with the door-side connector CB. Both ends of the net-like sheath 10 are fixed to the electrical cables W by wrapping with a tape 22. However, the ends of the net-like sheath 10 may be fixed to the electrical cables in any suitable manner. Further, as in the case of the first embodiment, both ends of the U-shaped folded portion W-1 of electrical cables W, which is to be contained in the harness housing 3, are fitted with a first clamp 15 and a second clamp 16. Further, an arrow-shaped mount 15f provided on the first clamp 15 is fixed in a harness housing 3, and a sliding recess 16g provided in the second clamp 16 is fitted with a guiding channel 3a provided in the harness housing 3 in a freely movable manner.

In the above embodiment, it is no longer necessary to carry out partial protections through a combined corrugated tube, net-like sheath and vinyl chloride tube, as in the case of the first embodiment. Assembly operations of the protective device are thus greatly simplified.

Figure 9:
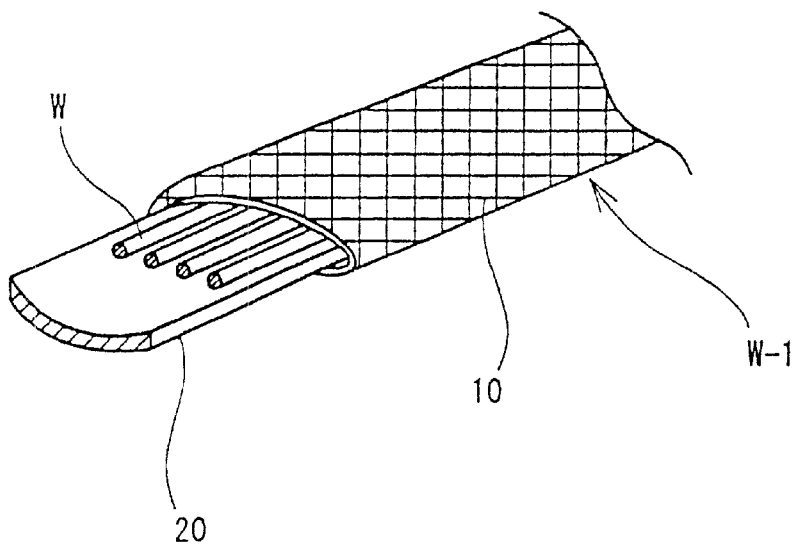
FIG. 9 is a perspective view along a cross-section of a folded portion of the electrical cables contained in the wire harness system according to a second embodiment of the invention.

FIG. 9 shows a third embodiment of the invention, in which the electrical cables W included in the folded portion W-1 are placed along an elastic band 20, e.g. a resilient metal band, and are assembled into a net-like sheath 10. The elastic band is formed from any suitable elastic material having a required hardness and foldability, such as material used for a wound measuring tape. The elastic band 20 may be slightly curved widthwise, so as to enhance its grouping wrapping efficiency. By adding an elastic band 20, the folded portion W-1 of the electrical cables W processes a foldability, as well as a required hardness.

Figure 2:
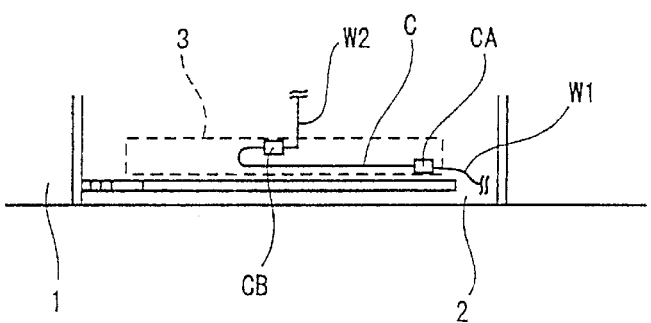
FIGS. 2A and 2B are side elevational views of a known wire harness system, when the sliding door is closed and open, respectively.
Figure 2:
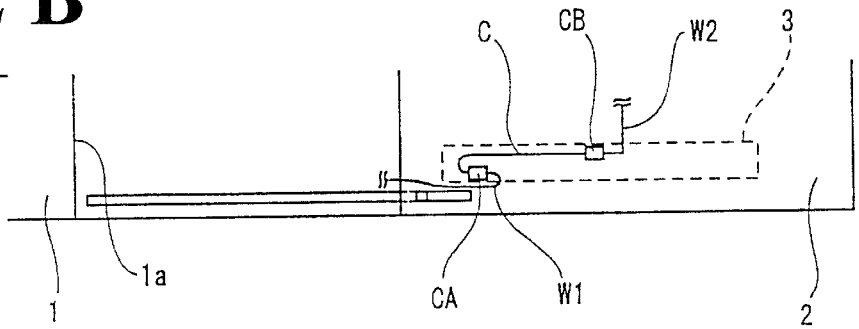
Figure 3:
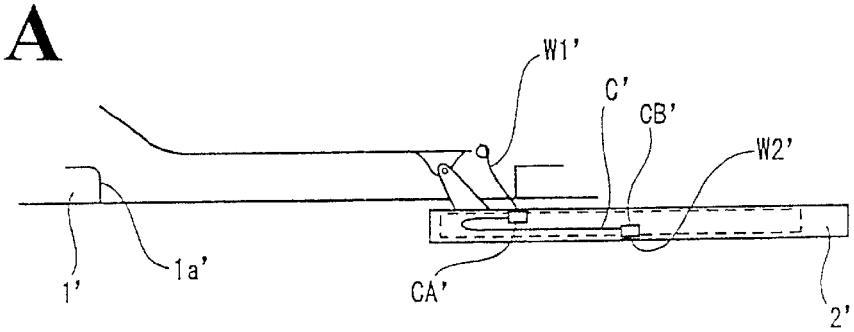
FIGS. 3A and 3B illustrate another known wire harness system, respectively shown in a top plan view and a side elevational view.
Figure 3:
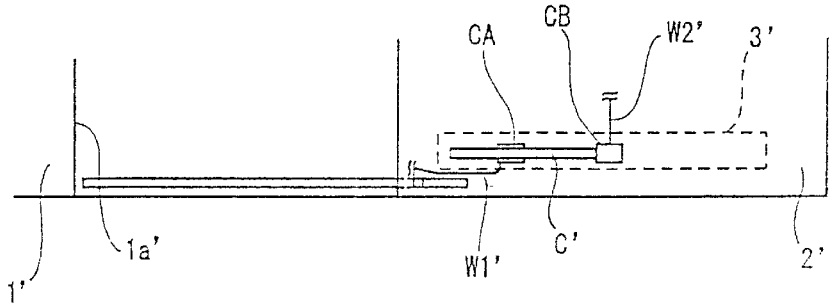
Figure 10:
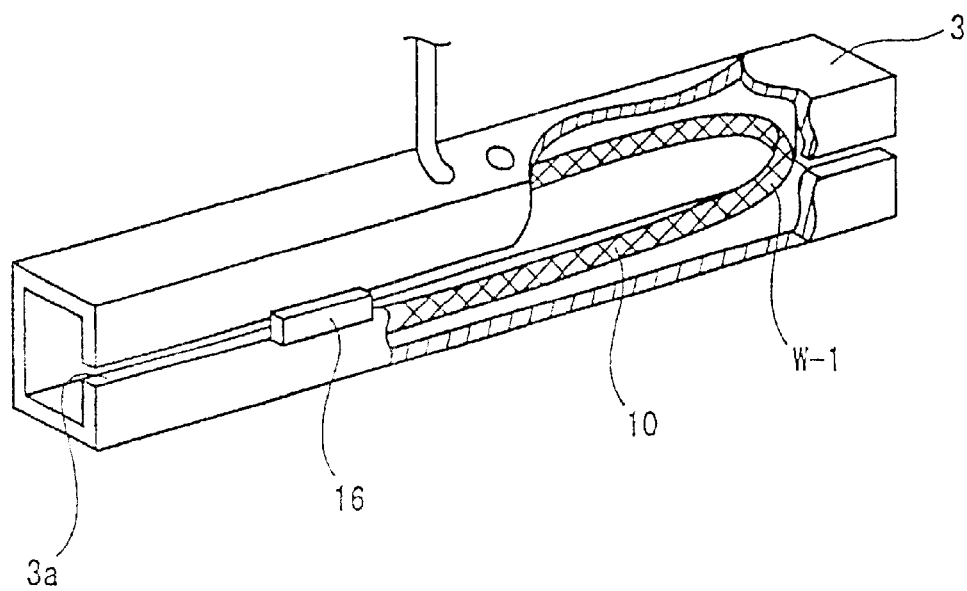
FIG. 10 is a partly exploded perspective view of the wire harness system according to a third embodiment of the invention, when the folded portion of the electrical cables is contained in the harness housing.

When the electrical cables W are supported by the elastic band 20, its U-shaped folded portion W-1 is preferably arranged horizontally with respect to the ground, as shown in FIG. 10. This arrangement corresponds to the known embodiments illustrated in FIGS. 3A and 3B. Likewise, the harness housing 3 may be mounted into the sliding door 2, with the guiding channel 3a facing the vehicle's body, and the folded portion W-1 is inserted into the harness housing 3. Although the reinforced folded portion is used, wiring between the body 1 and sliding door 2, as well as fitting into the harness housing 3, can be performed as mentioned for the first and second embodiments.

When the folded portion W-1 is not supported by an elastic band and placed horizontally, the U-shaped return end of the folded portion W-1 tends to hang down or droop under its own weight, thereby causing a frictional contact with the inner face of the harness housing 3. When the resilient band 20 is added, the folded portion W-1 is efficiently prevented from drooping, by virtue of the hardness of the elastic band 20, so that the folded portion W-1 can be maintained constantly in a horizontal position, and the friction with the harness housing 3 can be reduced to a minimum.

Figure 11:
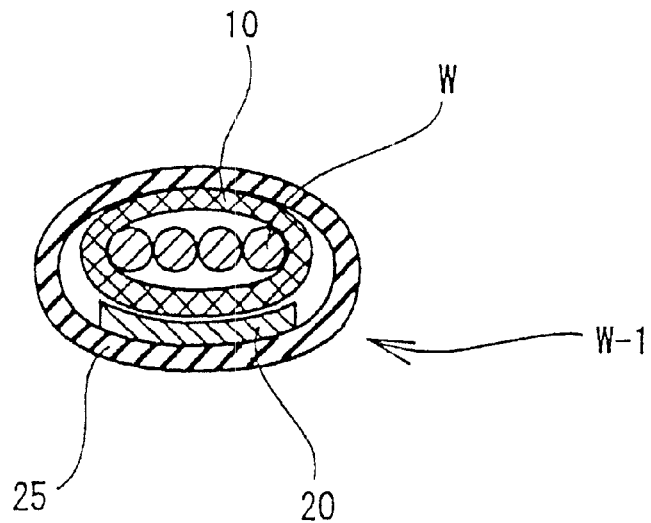
FIGS. 11A and 11B are the cross-sectional views of the folded portion, according to first and second variant examples, respectively, of the present invention.
Figure 11:
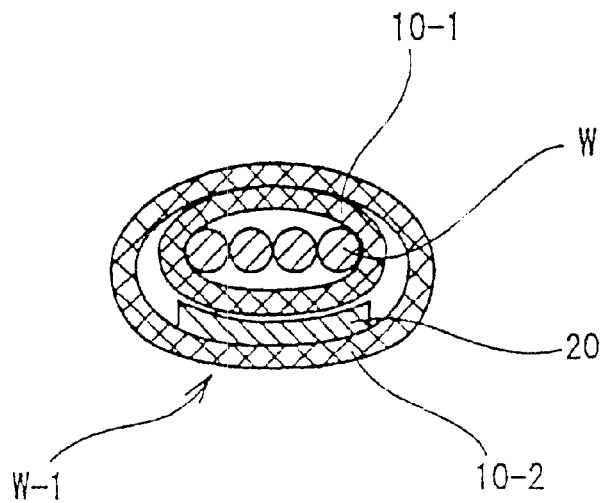

The elastic band 20 may be made of a metal. When the electrical cables W are to be prevented from making direct contacts with the steel band, the cables may be first covered with the net-like sheath 10, then reinforced with an elastic band 20, and the entire structure is finally bound with a tape 25 (see FIG. 11A). In other cases, the sliding span of the sliding door may be rather long, depending on the type of an automobile to be considered. The folded portion W-1 should then be harder and more rigid. In such a case, the electrical cables W may be wrapped with a first net-like sheath 10-1 and reinforced with an elastic band 20. The entire structure may then be further wrapped with a second net-like sheath 10-2, instead of a tape 25 (see FIG. 11B). In this construction, the electrical cables W are endowed with flexibility, while their hardness is further raised. In a variant embodiment, the folded portion W-1, reinforced with the elastic band 20, may also be applied to the case, when the U-shaped folded portion W-1 is laid in a vertical position, as described for the first and second embodiments.

Besides the simple net-like sheath used for the above three embodiments, the net-like sheath may be fitted two-folds or three-folds around the electrical wires W. Moreover, it may be fitted over the entire length of the electrical cables W or only on part thereof, depending on the shape or length of the door opening. Further, the harness housing 3 containing the folded portion W-1 may be installed in the vehicle's body side, instead of the sliding-door side. Even in such a case, the wire harness according to the invention can be wired with a suitably modified arrangement. Furthermore, instead of providing a harness housing with a guiding slit, a car-body panel or a sliding-door panel may be configured so as to form an enclosure with a guiding device, which is equivalent to the harness housing. A wire harness may then be passed through the net-like sheath, and folded into the enclosure so as to form a U-shaped folded portion with a slide device. The slide device of the folded portion may then be fitted with the guiding device of the enclosure in a freely movable manner.

As will be apparent from the foregoing, in the wire harness system of the invention, the same continuous electrical cables, which form a wire harness, can be wired from a vehicle's body to its sliding door, without recourse to a flat harness or flat cable. Accordingly, the wiring system is simplified, and the number of component parts to be used can be reduced. In the prior art technology, the wire harness was divided into three different kinds of wire harness: a first group of electrical cables, a flat harness or flat cable, and a second group of electrical cables. Connecting these wire harnesses through connectors requires a number of parts and several operational steps, thereby increasing problems of reliability. Conversely, the wire harness system according to the present invention utilizes continuous electrical cables and reduces connecting portions, so that the connection reliability is greatly improved. In addition, the time and work for its preparation is reduced, and its production costs are lowered. Moreover, the folded portion of the electrical wires is rendered more resistant to wear, so that accidental breakdowns of the electrical system can be reduced. Further yet, the stiffness of the folded folded portion can be adjusted, by changing the number of net-like sheaths and elastic bands to be used, as a function of the type of an automobile.

Although the invention has been described with reference to particular means, materials and embodiments, it is to be understood that the invention is not limited to the particulars disclosed and extends to all equivalents within the scope of the claims.

What is claimed:

1. A harness-wiring system, in which a wire harness, including a plurality of electrical cables, electrically connects a body of a vehicle to a sliding door thereof, one of the body and the sliding door including an enclosure, said wire harness including a lengthwise portion stored in said enclosure so as to form a folded portion having first and second enclosed end portions, said folded portion being located entirely within said enclosure, so that said wire harness can follow opening and closing movements of the sliding door by changing the shape of said folded portion;

said wire harness extending, as a joint-less continuous unit, from the body to the sliding door via said folded portion, and having first and second cable ends, said first cable end configured to fit with a body-side connector, said second cable end configured to fit with a door-side connector, and said plurality of cables of said wire harness being placed inside a net-like sheath for at least that part of said folded portion.

2. The harness-wiring system according to claim 1, wherein said wire harness is placed inside said net-like sheath extending substantially from said body-side connector to said door-side connector.

3. The harness-wiring system according to claim 1, wherein said folded portion further includes a resilient band, laid along said electrical cables at least at one locus of inside said net-like sheath and outside said net-like sheath.

4. The harness-wiring system according to claim 2, wherein said folded portion further includes a resilient band, laid along said electrical cables at least at one locus of inside said net-like sheath and outside said net-like sheath.

5. A harness-wiring system, in which a wire harness, including electrical cables, electrically connects a body of a vehicle to a sliding door thereof, one of the body and the sliding door including an enclosure, said wire harness including a lengthwise portion stored in said enclosure so as to form a folded portion having first and second enclosed end portions, so that said wire harness can follow opening and closing movements of the sliding door by changing the shape of said folded portion;

said wire harness extending, as a joint-less continuous unit, from the body to the sliding door via said folded portion, and having first and second cable ends, said first cable end configured to fit with a body-side connector, said second cable end configured to fit with a door-side connector, and said wire harness being placed inside a net-like sheath for at least that part of said folded portion;

further comprising a first enclosed end portion clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and a locking mechanism located at the other end of said pair of fixing pieces, distal to said hinge portion;

wherein said first enclosed end portion clamping device holds said first enclosed end portion of said wire harness by said pair of fixing pieces, and is locked by said locking mechanism.

6. The harness-wiring system according to claim 2, wherein said system further comprises a first clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and locking mechanism located at the other end of said pair of fixing pieces, distal to said hinge portion;

wherein said first clamping device holds said first enclosed end portion of said wire harness by said pair of fixing pieces, and is locked by said locking mechanism.

7. The harness-wiring system according to claim 3, wherein said system further comprises a first clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and locking mechanism located at the other end of said pair of fixing pieces, distal to said hinge portion;

wherein said first clamping device holds said first enclosed end portion of said wire harness by said pair of fixing pieces, and is locked by said locking mechanism.

8. The harness-wiring system according to claim 4, wherein said system further comprises a first clamping means including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and locking mechanism located at the other end of said pair of fixing pieces, distal to said hinge portion;

wherein said first clamping device holds said first enclosed end portion of said wire harness by said pair of fixing pieces, is locked by said locking mechanism.

9. The harness-wiring system according to claim 5, wherein said enclosure comprises a first fitting device and said first enclosed end portion clamping device comprises a second fitting device, so that said first enclosed end portion clamping device is fixed to said enclosure by fitting said first fitting device to said second fitting device.

10. The harness-wiring system according to claim 6, wherein said enclosure comprises a first fitting device and said first clamping device comprises a second fitting device, so that said first clamping device is fixed to said enclosure by fitting said first fitting device to said second fitting device.

11. The harness-wiring system according to claim 7, wherein said enclosure comprises a first fitting device and said first clamping device comprises a second fitting device, so that said first clamping device is fixed to said enclosure by fitting said first fitting device to said second fitting device.

12. The harness-wiring system according to claim 8, wherein said enclosure comprises a first fitting device and said first clamping device comprises a second fitting device, so that said first clamping device is fixed to said enclosure by fitting said first fitting device to said second fitting device.

13. A harness-wiring system, in which a wire harness, including electrical cables, electrically connects a body of a vehicle to a sliding door thereof, one of the body and the sliding door including an enclosure, said wire harness including a lengthwise portion stored in said enclosure so as to form a folded portion having first and second enclosed end portions, so that said wire harness can follow opening and closing movements of the sliding door by changing the shape of said folded portion;

said wire harness extending, as a joint-less continuous unit, from the body to the sliding door via said folded portion, and having first and second cable ends, said first cable end configured to fit with a body-side connector, said second cable end configured to fit with a door-side connector, and said wire harness being placed inside a net-like sheath for at least that part of said folded portion;

further comprising an enclosed end portion clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and a locking mechanism located at the other end of said pair of fixing pieces, distal to said hinge portion;

wherein said enclosed end portion clamping device holds said second enclosed end portion of said wire harness by said pair of fixing pieces, and is locked to said pair of fixing pieces by said locking mechanism.

14. The harness-wiring system according to claim 2, wherein said system further comprises a second clamping device including:

a pair of fixing pieces respectively including a semicircular recess, so that, when said fixing pieces are combined, both of said semicircular recesses form a holder means;

a hinge portion that pivotally connects said pair of fixing pieces, located at one end of said pair of fixing pieces; and locking mechanism located at the other end of said pair of fixing pieces, distal to said hinge portion;

wherein said second clamping device holds said second enclosed end portion of said wire harness by said pair of fixing pieces, and is locked by said locking mechanism.

15. The harness-wiring system according to claim 3, wherein said system further comprises a second clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and locking mechanism located at the other end of said pair of fixing pieces, distal to said hinge portion;

wherein said second clamping device holds said second enclosed end portion of said wire harness by said pair of fixing pieces, and is locked by said locking mechanism.

16. The harness-wiring system according to claim 4, wherein said system further comprises a second clamping device including:

a pair of fixing pieces respectively including a semicircular recess, so that, when said fixing pieces are combined, both of said semicircular recesses form a holder;

a hinge portion that pivotally connects said pair of fixing pieces, located at one end of said pair of fixing pieces; and locking mechanism located at the other end of said pair of fixing pieces, distal to said hinge portion;

wherein said second clamping device holds said second enclosed end portion of said wire harness by said pair of fixing pieces, and is locked by said locking means.

17. The harness-wiring system according to claim 13, wherein said enclosure comprises a first guide, and said enclosed end portion clamping device comprises a second guide, so that said enclosed end portion clamping device is fitted to said enclosure by fixing said second guide to said first guide in a freely movable manner.

18. The harness-wiring system according to claim 14, wherein said enclosure comprises a first guide, and said second clamping device comprises a second guide, so that said second clamping device is fitted to said enclosure by fixing said second guide to said first guide in a freely movable manner.

19. The harness-wiring system according to claim 15, wherein said enclosure comprises a first guide, and said second clamping device comprises a second guide, so that said second clamping device is fitted to said enclosure by fixing said second guide to said first guide in a freely movable manner.

20. The harness-wiring system according to claim 16, wherein said enclosure comprises a first guide, and said second clamping device comprises a second guide, so that said second clamping device is fitted to said enclosure by fixing said second guide to said first guide in a freely movable manner.

21. The harness-wiring system according to claim 1, wherein said net-like sheath comprises knitted resin threads.

* * * * *